United States Patent
Breish et al.

(10) Patent No.: US 12,051,177 B2
(45) Date of Patent: *Jul. 30, 2024

(54) IMAGE STITCHING FROM MULTIPLE LINE SCANNERS

(71) Applicant: DIGITAL CHECK CORP., Northbrook, IL (US)

(72) Inventors: Kurt Breish, Garden Valley, ID (US); Torin Ford, Boise, ID (US)

(73) Assignee: DIGITAL CHECK CORP., Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/197,551

(22) Filed: May 15, 2023

(65) Prior Publication Data
US 2023/0289936 A1    Sep. 14, 2023

Related U.S. Application Data

(63) Continuation of application No. 16/778,874, filed on Jan. 31, 2020, now Pat. No. 11,688,048.

(51) Int. Cl.
*G06T 5/50* (2006.01)
*G06T 7/00* (2017.01)
*H04N 1/00* (2006.01)

(52) U.S. Cl.
CPC .............. *G06T 5/50* (2013.01); *G06T 7/0002* (2013.01); *G06T 7/97* (2017.01); *H04N 1/00665* (2013.01); *G06T 2207/10008* (2013.01); *G06T 2207/20221* (2013.01); *G06T 2207/20224* (2013.01)

(58) Field of Classification Search
CPC ...... H04N 1/00665; H04N 1/028; H04N 1/03; H04N 1/0306; H04N 1/3876; H04N 25/7013; G06T 2207/10008; G06T 2207/20221; G06T 2207/20224;
(Continued)

(56) References Cited

U.S. PATENT DOCUMENTS

| 7,093,939 B2 | 8/2006 | Breish et al. |
| 2002/0051214 A1* | 5/2002 | Yamamoto ......... H04N 1/00167 358/302 |
| 2006/0072020 A1 | 4/2006 | McCutchen |

(Continued)

OTHER PUBLICATIONS

Preliminary Report on Patentability for related International Application No. PCT/US2020/016386; action dated Oct. 14, 2021; (7 pages).

*Primary Examiner* — Zhiyu Lu
(74) *Attorney, Agent, or Firm* — K&L Gates LLP

(57) ABSTRACT

Image stitching from multiple line scanners may be provided by selecting, at a plurality of times while progressing a film roll from a supply reel to a take-up reel, overlap areas on the film roll between first and second field of views of a first and second line scan sensors that read first and second data streams from the film roll; calculating, at each time, a difference measure between the first and second data streams in a current overlap area for a current time; adjusting, based on the difference measure, a size or a position of the overlap area for use at a subsequent time as the film roll progresses such that the current overlap area has a first number of pixels and a subsequent overlap area has a second number of pixels; and blending the first and second data streams at the current time at the current overlap area.

18 Claims, 8 Drawing Sheets

(58) Field of Classification Search
CPC .......... G06T 5/50; G06T 7/0002; G06T 7/32; G06T 7/97
See application file for complete search history.

(56) References Cited

U.S. PATENT DOCUMENTS

| | | | |
|---|---|---|---|
| 2009/0022419 A1* | 1/2009 | Molnar | G06T 7/30 |
| | | | 382/275 |
| 2010/0098399 A1 | 4/2010 | Breish et al. | |
| 2011/0096349 A1 | 4/2011 | Braudaway | |
| 2013/0076890 A1 | 3/2013 | Bovee | |
| 2015/0357000 A1* | 12/2015 | Howell | G11B 27/34 |
| | | | 386/241 |

* cited by examiner

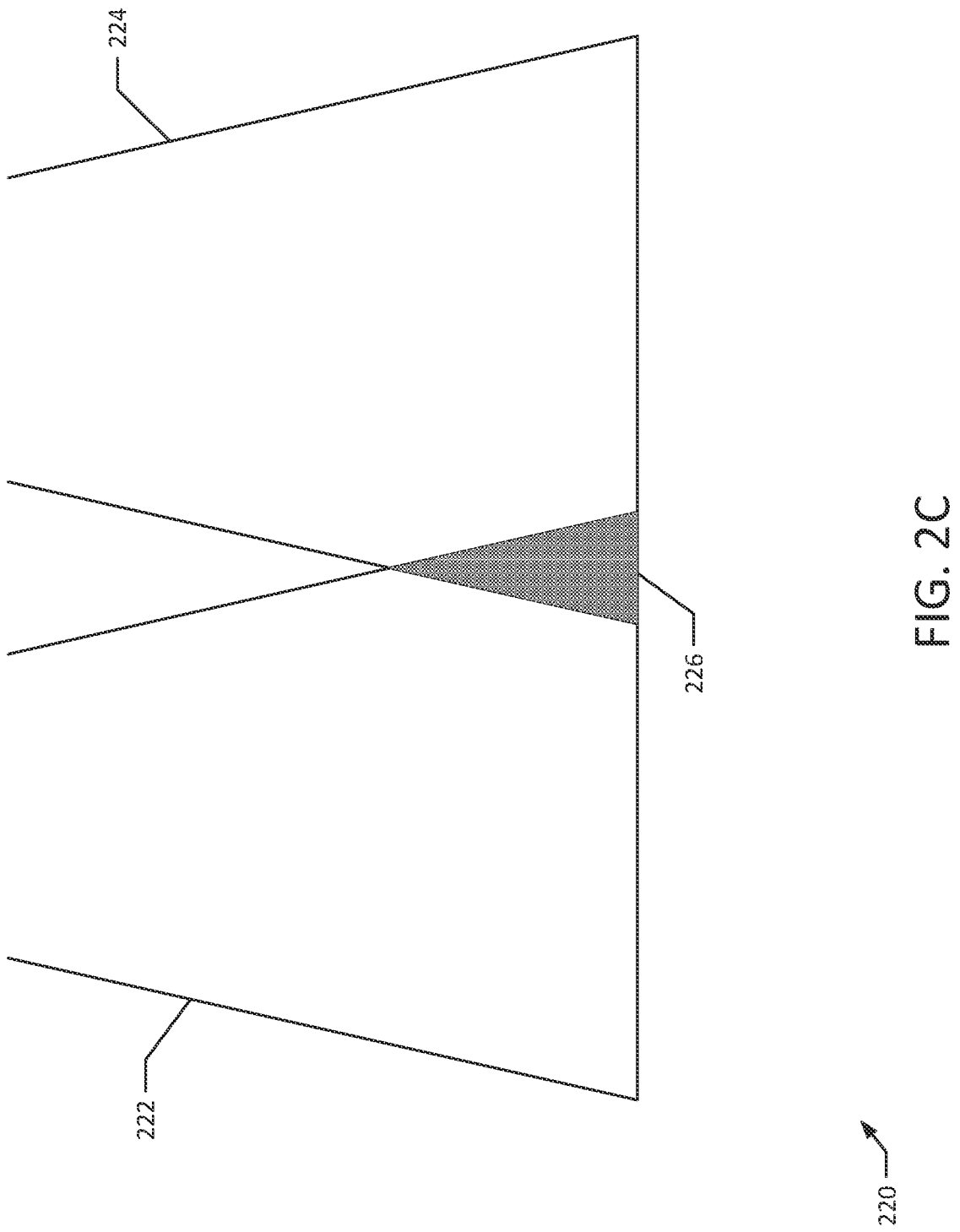

IMAGE STITCHING FROM MULTIPLE LINE SCANNERS

CROSS REFERENCE TO RELATED APPLICATIONS

The present application is a continuation of U.S. patent application Ser. No. 16/778,874, filed on Jan. 31, 2020, which claims priority to U.S. Patent Application No. 62/828,839, which was filed on Apr. 3, 2019, the disclosures of which are incorporated herein by reference for all purposes.

GOVERNMENT RIGHTS

This invention was made with government support under Prime Contract Number NGA-PLA-005 for Project Announcement #HM0476-19-9-1001, awarded by the National Geospatial-Intelligence Agency. The government has certain rights in the invention.

BACKGROUND

Film reel scanners are used to scan and digitize reels of film (e.g., reels containing images of documents) for imaging and archiving purposes. Film to be scanned is stored on reels, which are connected to the scanner. The scanner is configured to control the movement of the film through the scanner in order to accurately scan the film.

SUMMARY

The present disclosure presents new and innovative methods and systems for blending data streams from line image scanners. In a first aspect, a method is provided that includes receiving a first data stream from a first line scan sensor and a second data stream from a second line scan sensor, selecting an overlap position between the first and second data stream, wherein the overlap position forms an overlap area between the first and second data streams, and calculating a difference measure between the first and second data streams in the overlap area. The method may also include iteratively altering the overlap position between the first and second data streams to form a plurality of overlap positions and calculating a plurality of difference measures, wherein each additional difference measure corresponds to an overlap position of the plurality of overlap positions. The method may further include selecting a blending position corresponding to the overlap position of the plurality of overlap positions with the smallest difference measure and blending the first and second data streams at the blending position.

In a second aspect according to the first aspect, blending the first and second data streams comprises blending the first and second data streams at the blending position according to feathering weights.

In a third aspect according to the second aspect, blending the first and second data streams includes assigning a greater weight to pixels from the first data stream for pixel locations within the overlap area that are closer to the first data stream and assigning a greater weight to pixels from the second data stream for pixel locations within the overlap area that are closer to the second data stream.

In a fourth aspect according to the third aspect, blending the first and second data streams further includes assigning a first weight to pixel values from the first data stream and a second weight to the second data stream to pixel values from the pixel location within the overlap area closest to the first data stream, the first weight being larger than the second weight and assigning the first weight to pixel values from the second data stream and the second weight to pixel values from the first data stream for the pixel location within the overlap area closest to the second data stream. Blending the first and second data streams may also include transitioning the weights between the first weight and the second weight for pixel locations across the overlap area.

In a fifth aspect according to the fourth aspect, the first weight is a 100% weight and the second weight is a 0% weight.

In a sixth aspect according to any of the fourth or fifth aspects, transitioning the weights between the first weight and the second weight comprises linearly transitioning between the first weight and the second weight.

In a seventh aspect according to any of the fourth through sixth aspects, transitioning the weights between the first weight and the second weight comprises exponentially transitioning between the first weight and the second weight.

In an eighth aspect according to any of the first through seventh aspects, the overlap position is initially selected by scanning a length of target film.

In a ninth aspect according to any of the first through eighth aspects, calculating the difference measure includes subtracting pixel values between corresponding pixel locations of the first and second data streams within the overlap area.

In a tenth aspect according to the ninth aspect, calculating the difference measure further includes, for each pixel location within the overlap area subtracting the pixel value of the first data stream from a corresponding pixel value of the second data stream to form a pixel difference and taking the absolute value of the pixel difference.

In an eleventh aspect according to the first through tenth aspects, altering the overlap area comprises reducing the overlap position between the first and second data streams to reduce the size of the overlap area.

In a twelfth aspect, the method further includes receiving three or more data streams, including the first and second data streams, from three or more line scan sensors, including the first and second line scan sensors and repeating the steps of the method for each pair of data streams originating from adjacent line scan sensors.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

FIG. 2C illustrates a scanning area according to an exemplary embodiment of the present disclosure.

DETAILED DESCRIPTION OF EXAMPLE EMBODIMENTS

Figure 1:
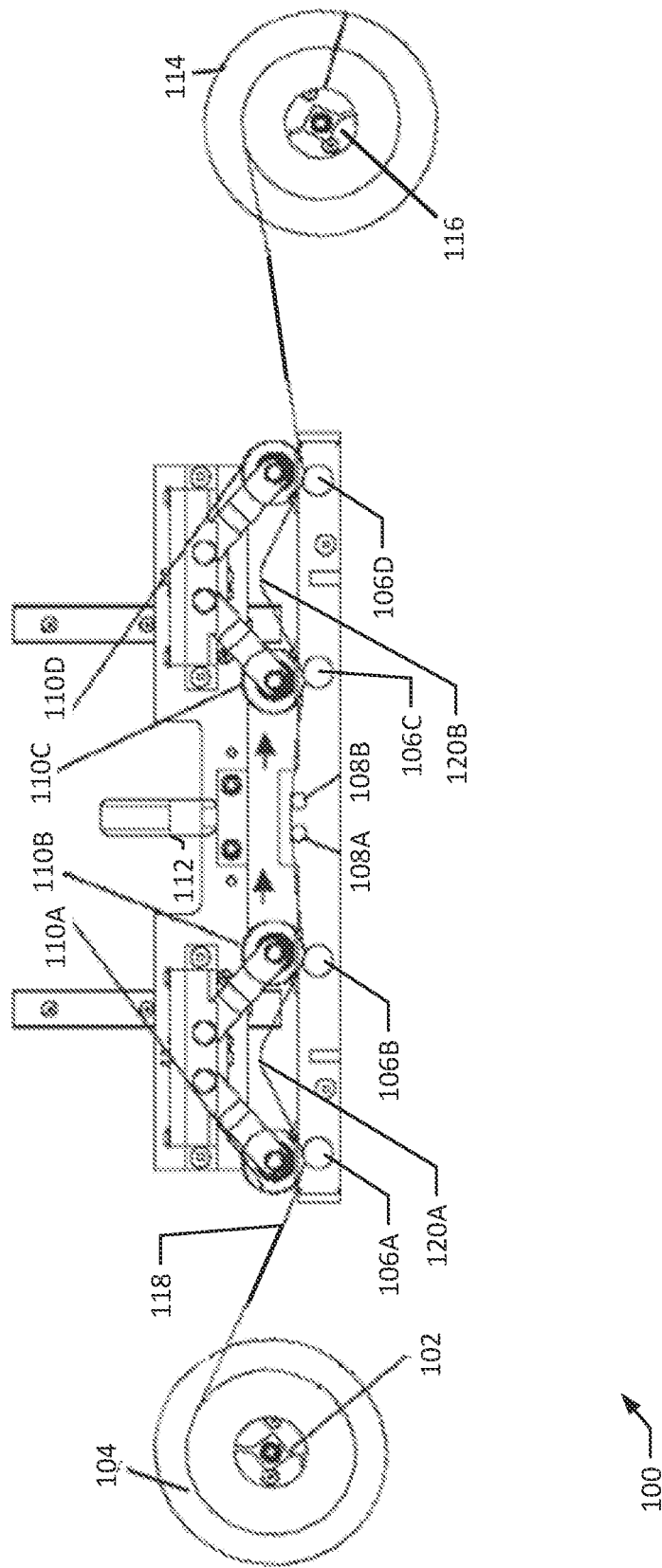
FIG. 1 illustrates a film reel scanner according to an exemplary embodiment of the present disclosure.

To scan film, a film reel scanner passes the film over a scanning area, where the film is scanned by a sensor array. FIG. 1 depicts a film reel scanner 100 according to an exemplary embodiment of the present disclosure. The film reel scanner 100 is configured to scan film 118 provided from a supply reel 104. The film 118 proceeds from the supply reel 104 across the capstans 106A-B to a scanning area framed by scrollbars 108A-B for scanning by the camera 112. The camera 112 may be a line image scanner (e.g., a line scan camera) configured to scan successive, single pixel—height lines of the film 118 as the film 118 moves across the scanning area. For example, the camera 112 may include a lens and a sensor (e.g., a line image sensor). The camera 112 may also include one or more mirrors. The film 118 then proceeds across the capstans 106C-D to the take-up reel 114, where the film is wound around the take-up reel 114 for storage and future archiving. The film 118 may be held against the capstans 106A-D by corresponding pinch rollers 110A-D. The capstans 106A-D may be actively controlled by capstan motors, while the pinch rollers 110A-D may roll passively based on the movement of the film between the capstans 106A-D and the pinch rollers 110A-D The supply reel 104 includes a supply reel motor 102 that controls the rate at which film 118 is transported from the supply reel 104 into the capstan 106A. Similarly, the take-up reel 114 includes a take-up reel motor 116 that controls the rate at which film 118 is received from the capstan 106D. Both motors 102, 116 may generally have to be balanced in order to keep a constant flow of film 118 through the scanner 100. Additionally, each capstan 106A-D may be controlled to balance the progression of film 118 through the film reel scanner 100. For example, each capstan 106A-D may include a corresponding capstan motor configured to control the rotation of the capstan 106A-D such that the film 118 progresses at the same rate through the scanner 100. Similarly, the capstans 106A-D may be configured to form film loops 120A-B. The film loops 120A-B may absorb vibrations within the scanner 100 and reduce the movement of the film 118 in the scanning area between the scrollbars 108 A-B. The motors 102, 116 in the capstans 106A-D may also be configured to maintain one or more tension requirements of the film 118. For example, the film 118 may require a minimum amount of tension within the scanner 100 in order to consistently and accurately move across the scanning area for scanning the camera 112 and to properly unspool film 118 from the supply reel 104 and to re-spool film 118 to the take-up reel 114. However, the film 118 may also need to be kept below a maximum amount of tension in order to avoid tearing, warping, or other damage.

Although FIG. 1 depicts a specific configuration for the film reel scanner 100, the methods and configurations described herein may also be used with other film reel scanner implementations. For example, alternative film reel scanners may include additional components and/or may exclude one or more components depicted in the scanner 100. In another example, one or more components of the scanner 100 may be rearranged or altered. For example, in certain implementations, the film loops 120A-B may be located between the capstans 106A, D and reels 104, 114. As another example, the film loops 120A-B may be formed by a bail arm (e.g., a bail arm configured to support and/or apply tension to the film loops. Such implementations may be beneficial for films with larger widths (e.g., films with widths of 5 inches or more).

In certain implementations, the camera 112 of the scanner 100 may be implemented as a line scan camera configured to scan successive pixel-height lines of the film 118 to assemble an image of the film 118. In certain implementations, multiple line scan cameras may be necessary to meet resolution or film size requirements. Images captured by these cameras may subsequently be combined into a single image of the film or may be captured continuously as a single image of the film. However, in such implementations, the line scan cameras may have overlapping fields of view, so combining images from multiple line scanners may require accounting for portions of the images captured by each line scanner camera that correspond to the overlapping fields of view. Such images may be combined by overlapping one image over the other in the overlapping portions of the field of view or by evenly combining both images in the overlapping portions of the field of view. However, such techniques may create visible seams or other artifacts that adversely affect the quality of the combined images. The camera 112 may be configured to capture either or both of color images and black and white images.

One solution to combining images from multiple, overlapping image scanning cameras is to select an initial overlap position between data streams captured from two cameras with overlapping fields of view. Then, the pixels within the overlapping fields of view from each camera may be compared to calculate a difference measure reflecting how different corresponding pixels positions within the selected initial overlap area. This process may then be repeated multiple times with different overlap positions between the data streams to select a blending position, which may be the overlap position with the smallest difference measurement. The data streams may then be blended at the selected blending location by feathering pixel data from both data streams. For example, the data streams may be weighted so that pixel locations within the overlap area that are closer to one camera are generated with a greater weight on pixels originating from the closer camera, and transitioning between the weights for intermediate positions.

Figure 2A:
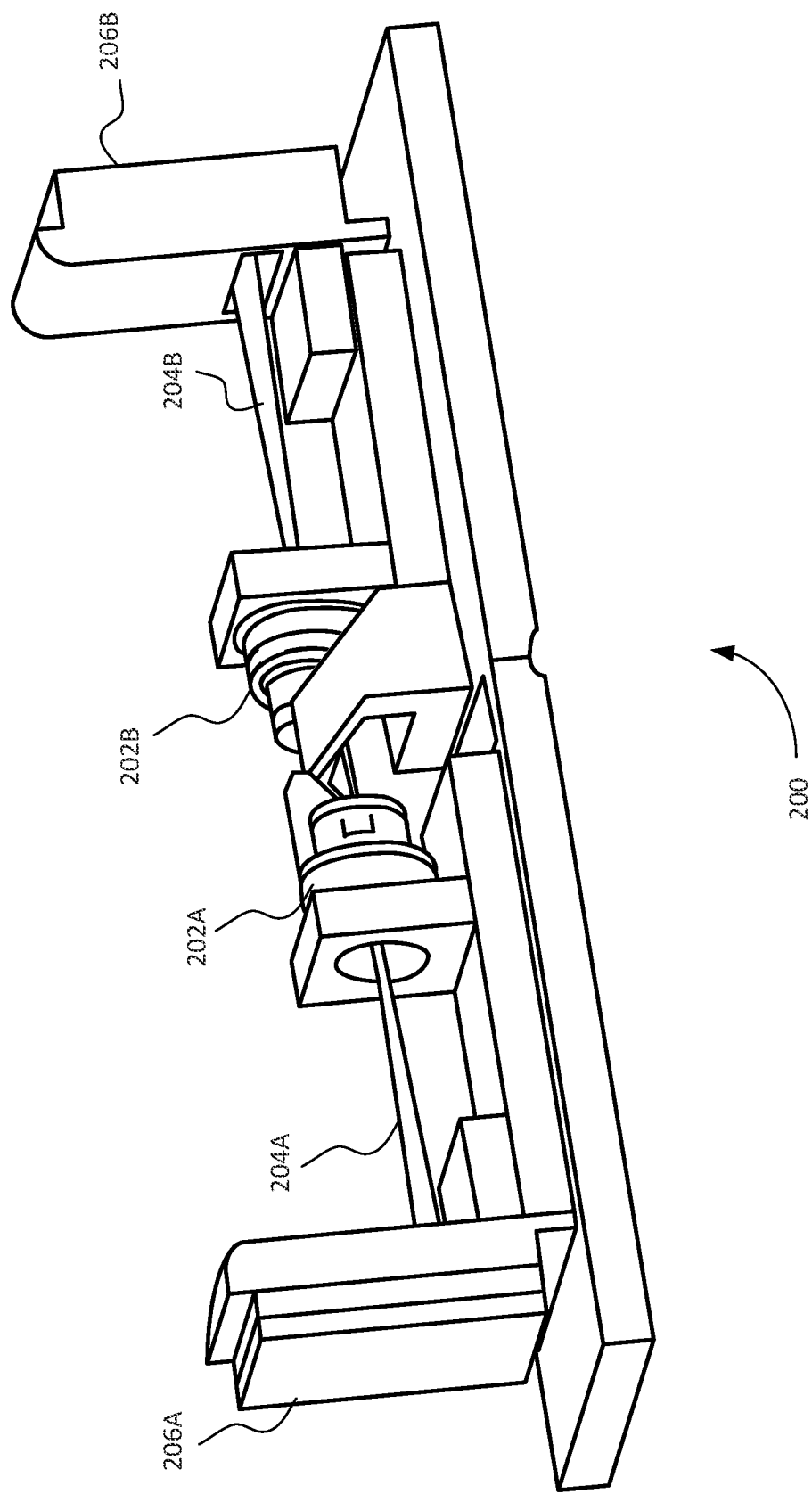
FIGS. 2A and 2B illustrate sensor arrays according to exemplary embodiments of the present disclosure.

FIG. 2A depicts an example sensor array 200 according to an exemplary embodiment of the present disclosure. The sensor array 200 may be used in film scanners, such as the scanner 100 to scan film 118. The sensor array 200 includes two sensors 206A-B that capture successive scanned lines of the film 118 to form an image of the film. As depicted, each sensor 206A-B has a field of view 204A-B, within which the sensors 206A-B receive light that passes through the film 118 in a scanning area of the scanner 100. In particular, the fields of view 204A-B depict that path of the light as it passes through lenses 202A-B and is redirected toward the sensors 206A-B. In certain implementations, the light may be generated by a strobing light (e.g., a strobing LED) that passes through the film 118. As light passes through the film within a field of view 204A-B of the sensors 206A-B, the sensor 206A-B may capture and generate a digital representation of the received light as a single-pixel height portion of an image. As the film 118 translates across the scanning area of the scanner 100, the sensor array 200 may successively capture a plurality of scanlines that are combined to form an image of the film 118. In certain implementations, the fields of view 204A-B may overlap and, in order to combine images captured by each sensor 206A-B, pixels corresponding to the overlapping area may need to be blended between the images captured by each sensor 206A-B.

Figure 2B:
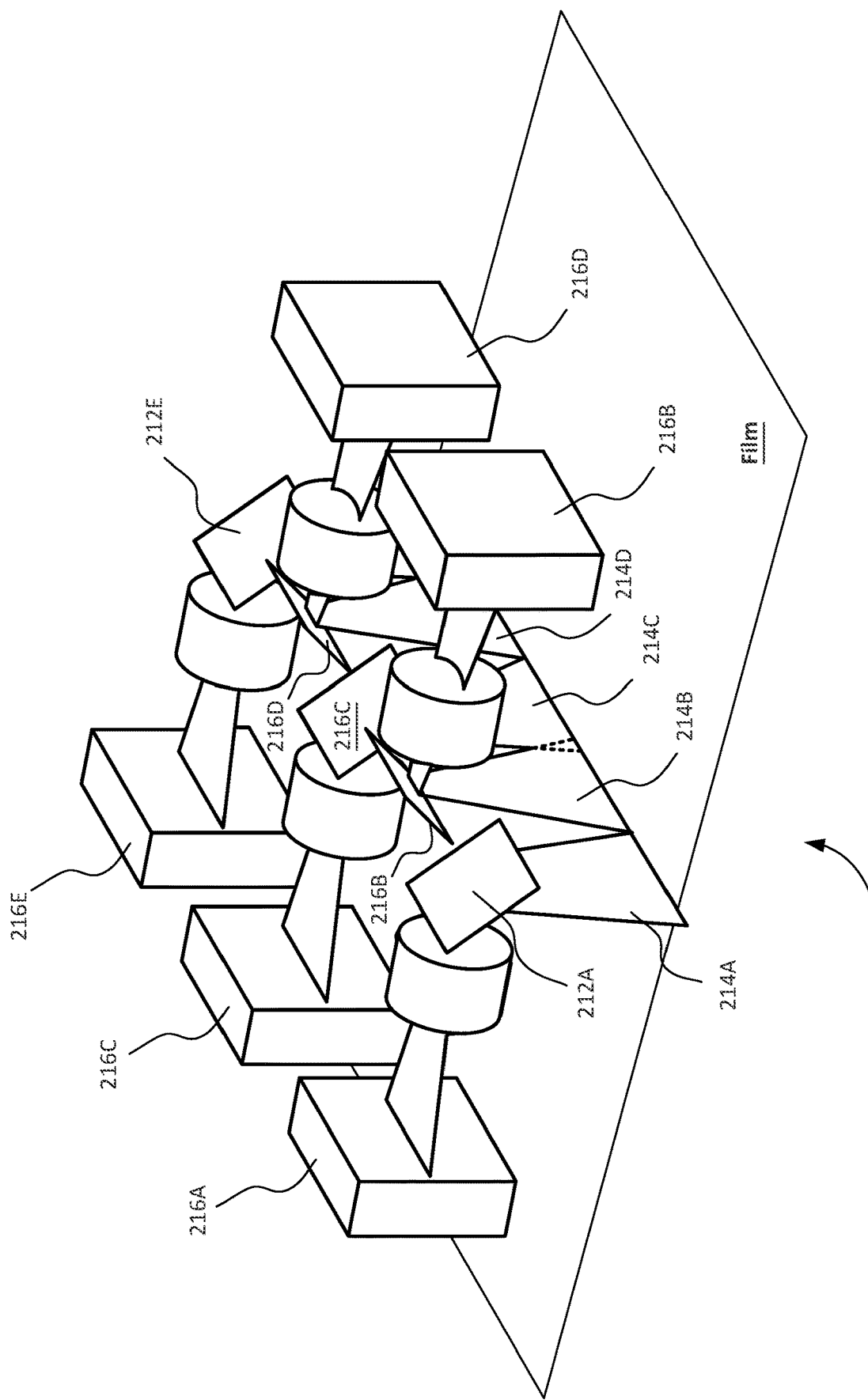

FIG. 2B depicts an example sensor array 210 according to an exemplary embodiment of the present disclosure. Similar to the sensor array 200, the sensor array 210 may be used in film scanners such as the scanner 100 to scan film 118. The sensor array 210 includes five sensors 216 A-E and five corresponding lenses. Each sensor has fields of views 214A-D that reflect through corresponding mirrors 212A-E and lenses toward the sensors 216A-E. Although not visible in FIG. 2B, the sensor 216E also has a corresponding field of view. Similar to the sensors 206A-B, the sensors 216A-B may capture successive scanned lines of the film 118 and may combine the scanlines into an image of the film 118. FIG. 2B also depicts a bottom portion of the field of views 214A-E, which may represent the path followed by light after passing through the film 118.

The lower portions of the fields of view 214A-D overlap as depicted. As discussed above, overlapping portions of field of views 214A-D received by the sensors 216A-D may need to be accounted for when combining the images from each sensor 216A-E to form a single, composite image of the entire width of the film 118. Otherwise, if the images are instead combined directly together without accounting for the overlapping area, the composite image of the film 118 will contain multiple depictions of the portions of the film 118 located in the overlapping areas of the field of views 214A-D.

The sensor arrays 200, 210 differ primarily in that the array 200 includes two sensors 206A-B and corresponding lenses 202A-B and the array 210 includes five sensors 216A-E and corresponding mirrors 212A-E and corresponding lenses. Similar arrays may include more or fewer sensors than those depicted in the arrays 200, 210. For example, certain embodiments of the arrays 200, 210 may include four sensors. The number of sensors included within an array may be selected according to resolution or film width requirements. For example, each sensor 206A-B, 216A-E may have an effective line resolution that can be captured. Similarly, a desired scanner 100 may need to scan film 118 of a certain size, or to scan the film 118 with a particular resolution. Accordingly, sensors may be added to a sensor array 200, 210 until the desired film size and/or resolution requirements are met.

FIG. 2C depicts a scanning area 220 according to an exemplary embodiment of the present disclosure. Scanning area 220 includes two fields of view 222, 224, which may each correspond to sensors 206 A-B, 216 A-E of a sensor array 200, 210. For example, the fields of view 222, 224 may correspond to adjacent sensor 206A and 206B within the sensor array 200. Similar implementations regarding sensors 216A-E are also possible. Due to their geometries, the fields of view 222, 224 overlap, forming an overlapping area 226. Accordingly, light that passes through the film 118 within the overlap area 226 may be received by both sensors 206A and 206B, resulting in duplicated capture of the portions of the film 118 within the overlap area 226.

The size of the overlap area 226 may differ depending on the sensor array 200, 210. For example, the geometry of the fields of view 222, 224 may be adjusted by varying the lenses 222A-B or mirrors that redirect the light after passing through the film. Similarly, depending on the relative positioning of multiple sensors within the arrays 200, 210, the size of the overlapping area 226 may vary between different sensors of the array. For example, in the sensor array 210, sensors 216A and 216B are adjacent in the array 210 and may have an overlap area 226 that differs in size from the overlap area 226 of the sensors 216D and 216E, which are also adjacent in the array 210. Additionally, the size of the overlap area 226 may change over time, e.g., as the sensors 206A and 206B move slightly during use. Accordingly, any techniques used to successfully incorporate image data from within the overlap area 226 must be able to account for changes and inconsistencies of overlap area 226 size between sensors 206A and 206B and over time.

Figure 3:
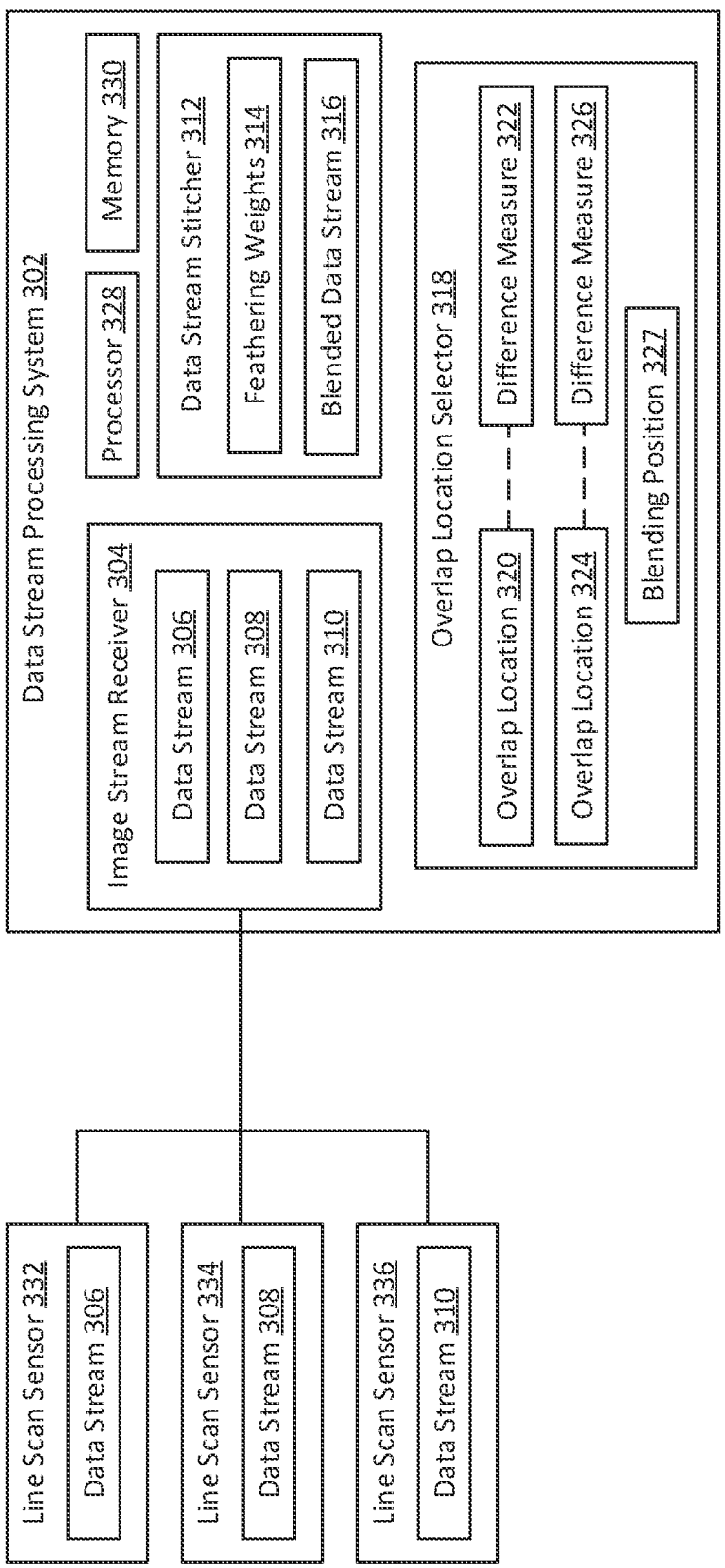
FIG. 3 illustrates a system according to an exemplary embodiment of the present disclosure.

FIG. 3 depicts a system 300 according to an exemplary embodiment of the present disclosure. The system 300 may be configured to capture and process data streams from a plurality of line scan cameras into a single image of film. For example, the scanner 100 may capture a plurality of data streams from the sensors 206A-B, 216A-E and may combine the data streams into a combined image of the film 118. The system includes line scan sensors 332, 334, 336 generating data streams 306, 308, 310 and a data processing system 302. The data processing system 302 includes an image stream receiver 304 storing data streams 306, 308, 310, a data stream stitcher 312 storing feathering weights 314 and a blended data stream 316, and an overlap location selector 318 storing overlap locations 320, 324, corresponding difference measures 322, 326, and a blending position 327. The data stream processing system 302 also includes a processor 328 and a memory 330. The processor 328 and the memory 330 may implement one or more aspects of the data stream processing system 302, such as the image stream receiver 304, the data stream stitcher 312, and the overlap location selector 318. For example, the memory 330 may store instructions which, when executed by the processor 328, may cause the processor 328 to perform one or more operational features of the data stream processing system 302. In certain implementations, the processor 328 may include one or more of a central processing unit (CPU), a graphical processing unit (GPU), and/or a field-programmable gate array (FPGA).

The line scan sensors 332, 334, 336 may be exemplary embodiments of the cameras comprised of the sensors 206A-B, 216A-E and the associated lenses 202A-B and mirrors 212 A-E and may successively scan lines of a film 118 and may generate data streams 306, 308, 310 that combine the scanned lines from each line scan sensor into corresponding images. The data streams 306, 308, 310 may be generated on a continuous basis, or may generate a plurality of segments (e.g., segments including a predetermined number of scanned lines).

The image stream receiver 304 may be configured to receive the data streams 306, 308, 310 from the line scan sensors 332, 334, 336. The data streams 306, 308, 310 may be received from the line scan sensors 332, 334, 336 on a continuous basis, or may be received periodically (e.g., may periodically receive segments from the line scan sensors 332, 334, 336). In implementations where the data streams 306, 308, 310 are received on a continuous basis, the image stream receiver 304 may generate a plurality of segments based on the continuous basis for subsequent processing.

The overlap location selector 318 may be configured to estimate a blending position 327 corresponding to the overlap area 226 between two of the line scan sensors 332, 334, 336. For example, the line scan sensors 332, 334 may be adjacent in a sensor array 200, 210 and may have overlapping fields of view 222, 224, resulting in an overlap area 226. In order to properly combine data streams 306, 308, 310 from multiple sensors, it may be necessary to accurately estimate an overlap location 320, 324 corresponding to the overlap area 226 to properly account for the overlap area. Therefore, the overlap location selector 318 may be configured to select and test a plurality of overlap locations 320, 324 and to compute a difference measure 322, 326 for the overlap locations 320, 324. Based on the difference measures 322, 326, the overlap location selector 318 may select a blending position 327 from among the tested overlap locations 320, 324.

The data stream stitcher 312 may be configured to generate a blended data stream 316 based on a plurality of data streams 306, 308, 310 into a blended data stream 316. For example, as discussed above, each data stream 306, 308, 310 may correspond to a cross-sectional subset of the film 118 and the blended data stream 316 may represent a complete cross-section of the film 118, enabling a complete scanned image of the film 118. The data stream stitcher 312 may generate the blended data stream 316 by blending the data streams 306, 308, 310 at the blending position 327. In particular, the data stream stitcher 312 may blend the data streams 306, 308, 310 based on feathering weights 314.

Figure 4:
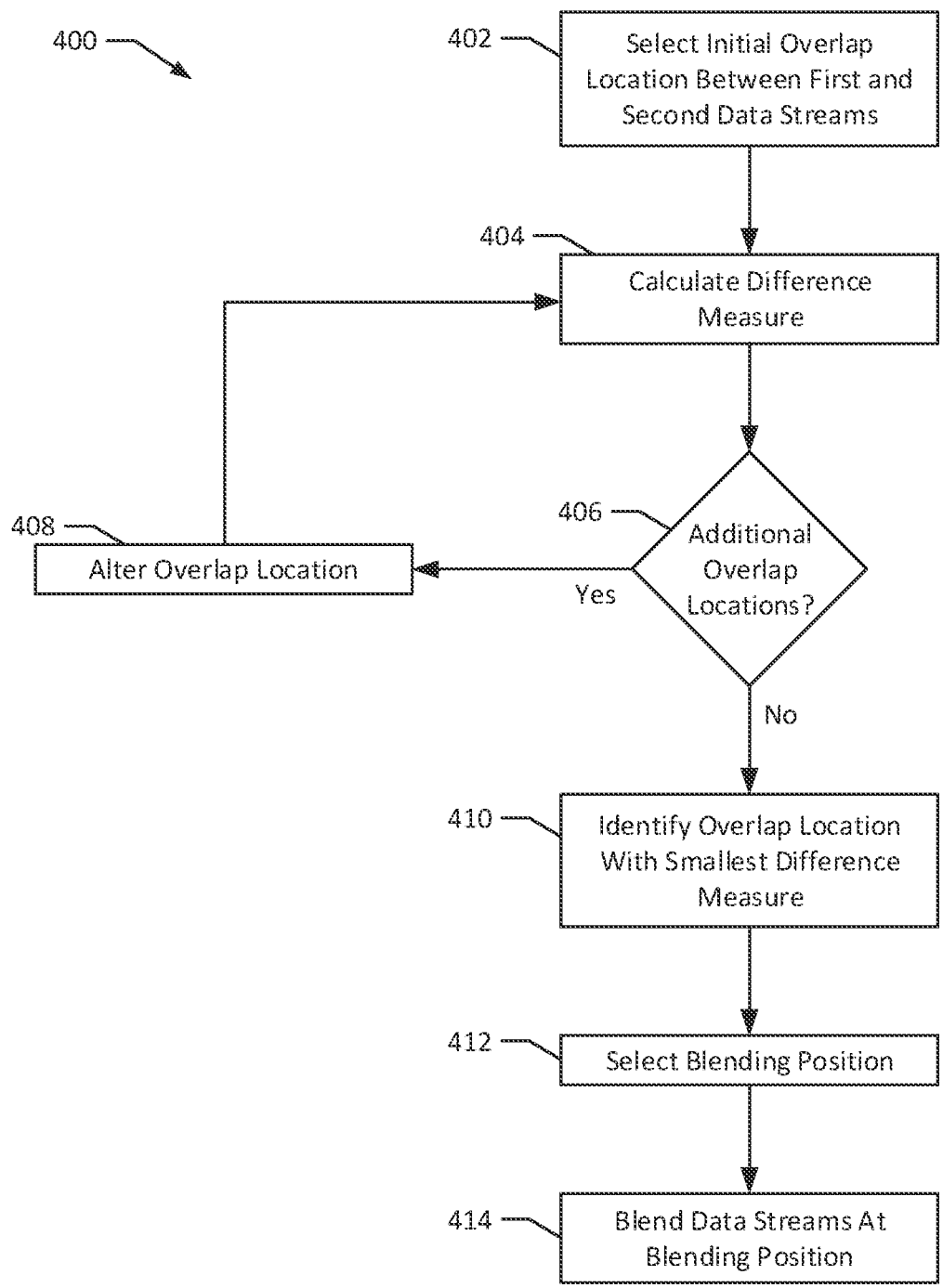
FIG. 4 illustrates a method according to an exemplary embodiment of the present disclosure.

FIG. 4 depicts a method 400 according to an exemplary embodiment of the present disclosure. The method 400 may be performed to identify a blending position 327 that corresponds to an overlap area 226 between two sensors 206A-B, 216A-E, 332, 334, 336 and to blend corresponding data streams 306, 308, 310 from the sensors 206A-B, 216A-E, 332, 334, 336 into a blended data stream 316. The method 400 may be performed by a computer system, such as the system 300. For example, the method 400 may be performed by the data stream processing system 302, including by one or more of the image stream receiver 304, the overlap location selector 318, and the data stream stitcher 312. The method 400 may also be implemented by a set of instructions stored on a computer readable medium that, when executed by a processor, cause the computer system to perform the method. For example, all or part of the method 400 may be implemented by the processor 328 and the memory 330. Although the examples below are described with reference to the flowchart illustrated in FIG. 4, many other methods of performing the acts associated with FIG. 4 may be used. For example, the order of some of the blocks may be changed, certain blocks may be combined with other blocks, one or more blocks may be repeated, and some of the blocks described may be optional.

Figure 6:
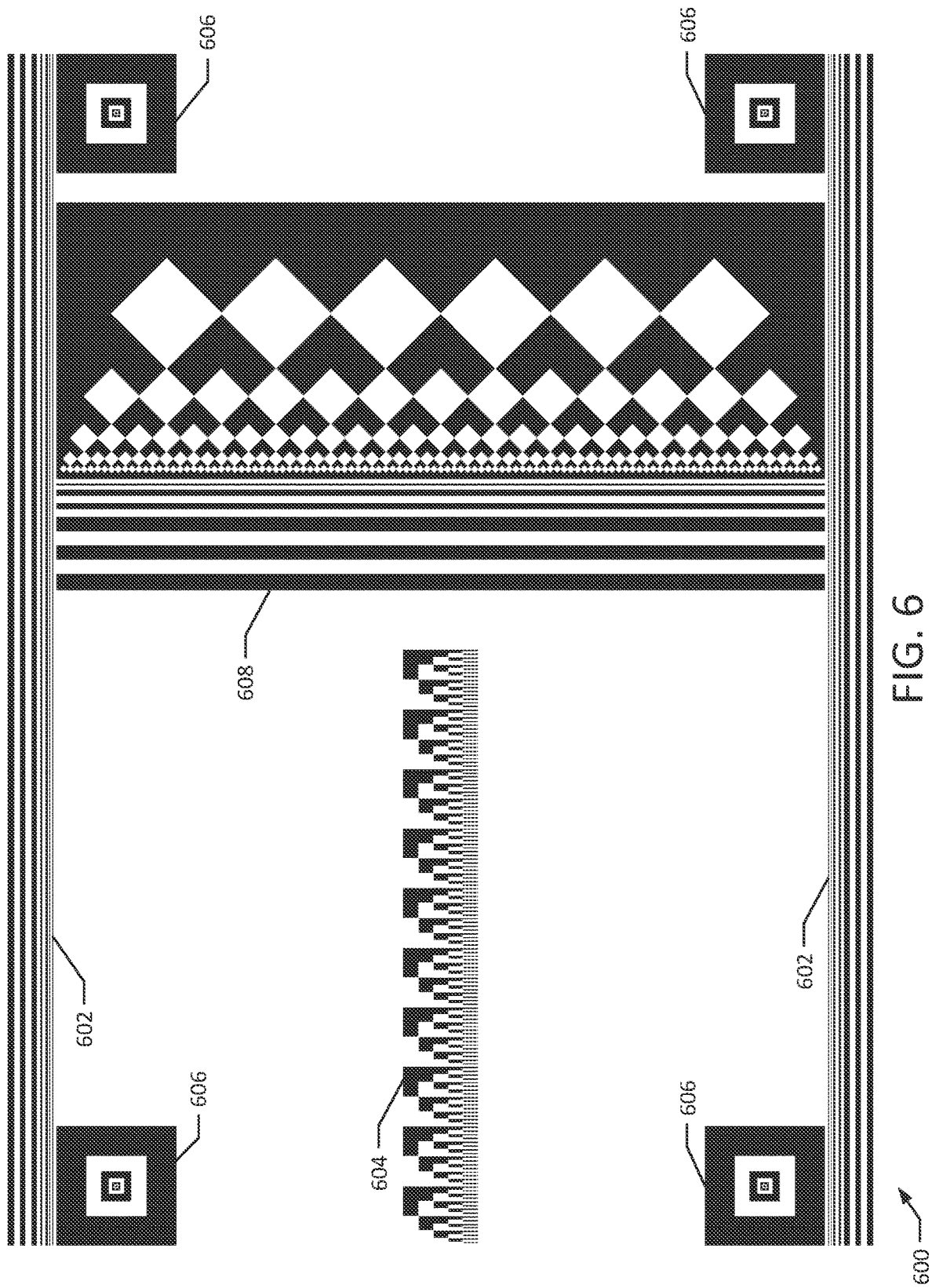
FIG. 6 illustrates target film according to an exemplary embodiment of the present disclosure.

The method 400 begins with the overlap location selector 318 selecting an initial overlap location between first and second data streams (block 402). For example, the overlap location selector 318 may select the initial overlap position as a certain percentage of overlap between the first and second data streams (e.g., 10% of overlap) or as a certain number of pixels of overlap between the first and second data streams (e.g., 100 pixels of overlap). In still further implementations, the overlap location selector 318 may select the initial overlap location by scanning a target film. For example, FIG. 6 depicts a target film 600 that includes horizontal alignment rulings 602, capstan calibration rulings 604, corner alignment features 606, and a sensor alignment grid 608. In certain implementations, the scanner 100 may be configured to scan a length of target film 600 to determine initial overlap locations.

For example, FIG. 6 depicts a target film 600 according to an exemplary embodiment of the present disclosure. The target film 600 includes horizontal alignment ruling 602, capstan calibration rulings 604, corner alignment features 606, and a sensor alignment grid 608. The scanner 100 may scan the target film 600 and examine one or more features of the sensor alignment grid 608 to determine the initial overlap location. For example, the overlap location selector 318 may be configured to analyze data streams 306, 308, 310 corresponding to the target film 600 for one or more common features from the sensor alignment grid 608 in an overlap area between two sensors 206A-B, 216A-E, 332, 334, 336. In particular, in implementations involving the target film 600, the overlap location selector 318 may select the initial overlap position by performing at least a portion of the method 400 (e.g., blocks 402-412) on a scanned image of the target film 600. In such implementations, the overlap location selector 318 may begin with an overlap location of a certain number of overlapping pixels or a certain percentage of overlap as discussed above and may proceed with the method 400 to select a blending position 327 for the target film 600, similar to the operations discussed below for the film 118. The selected blending position 327 for the target film 600 may then be used as the initial overlap location for subsequent iterations of the method 400 (e.g., iterations performed while scanning film 118).

The overlap location selector 318 may then calculate a difference measure for the initial overlap location (block 404). The overlap location selector 318 may calculate the difference measure by subtracting pixel values between corresponding pixel locations of the first and second data streams 306, 308, 310 within the overlap area 226. In particular, to subtract the pixel values, the overlap location selector 318 may subtract the pixel value of the first data stream from a corresponding pixel value of the second data stream to form a pixel difference. The overlap location selector 318 may then take the absolute value of the pixel difference. This process may be repeated for each pixel location within the overlap area 226. The overlap location selector 318 may then sum the pixel differences to calculate the difference measure for the initial overlap position. After calculating the initial difference measure for the initial overlap position, the overlap location selector 318 may store an indication of the initial overlap location and the initial difference measure, similar to the overlap locations 320, 324 and the difference measures 322, 326.

The overlap location selector 318 may then determine whether there are additional overlap locations to test (block 406) and, if so, may alter the overlap location (block 408). If additional overlap locations 320, 324 remain, the overlap location selector 318 may alter the overlap location 320, 324 by reducing the size of the overlap area 226 corresponding to the presently-selected overlap location 320, 324. For example, the overlap location selector 318 may reduce the size of the overlap area 226 by a set number of pixels (e.g., 1 pixel, 5 pixels, 10 pixels) or by a certain percentage (e.g., 10%, 5%, 1%). In additional or alternative implementations, the overlap location selector 318 may alter the overlap location 320, 324 by increasing the size of the corresponding overlap area. For example, if the selected initial overlap location has a comparatively small overlap area 226 (e.g., 1-5 pixels in size), the overlap location selector 318 may increase the size of the overlap area by a set number of pixels or by a certain percentage. After altering the overlap location 320, 324, the overlap location selector 318 may calculate a difference measure 322, 326 corresponding to the altered overlap location 320, 324, as described above in connection with block 404.

The overlap location selector 318 may repeat the blocks 406, 408, 404 until no additional overlap locations 320, 324 remain at block 406. For example, in implementations where the overlap location selector 317 reduces the size of the overlap area 226 at block 408, the overlap location selector 317 may continue altering the overlap location 320, 324 until a resulting overlap area 226 would be too small. For example, where the overlap location 320, 324 is altered by a set amount of pixels, the overlap location selector 318 may determine that no additional overlap locations 320, 324 remain when the resulting overlap area 226 is less than the number of pixels by which the size of the overlap area 226 changed at block 408 (e.g., 1 pixel, 5 pixels, 10 pixels). In implementations where the size of the overlap area 226 changes by certain percentage at block 408, the overlap location selector 318 may determine that no additional overlap locations 320, 324 remain when the resulting overlap area 226 would be less than a predetermined number of pixels (e.g., 1 pixel, 5 pixels, 10 pixels). In still further embodiments, the overlap location selector 318 may be configured to compute a difference measure 322, 326 for a set number of overlap locations (e.g., 5 overlap locations).

When the overlap location selector 318 determines that no additional overlap positions remain (block 406), the overlap location selector 318 may identify the overlap location 320, 324 with the smallest associated difference measure 322, 326. For example, the overlap location selector 318 may compare each of the difference measures 322, 326 to identify the smallest difference measure 322, 326. The overlap location selector 318 may then identify the overlap location 320, 324 associated with the smallest difference measure 322, 326.

The overlap selector may then select a blending position 327 (block 412). For example, the overlap location selector 318 may select the blending position 327 as the overlap location 320, 324 corresponding with the smallest difference measure 322, 326 identified at block 410.

The data stream stitcher 312 may then blend the first and second data streams 306, 308, 310 at the identified blending position 327 (block 414). For example, the data stream stitcher 312 may combine the pixels of each data stream 306, 308, 310 within the overlap area 226 corresponding to the selected blending position 327 according to the feathering weights 314. In particular, the feathering weights 314 may specify a percentage weight given to pixels within the overlap area 226 from each of the first and second data streams 306, 308, 310 based pixel's proximity to the edges of the overlap area closest to the first and second data stream 306, 308, 310. For example, the feathering weights 314 may indicate a weight for differing pixel positions within the overlap area for each data stream. The data stream stitcher 312 may multiply the feathering weights 314 at each pixel position and for each data stream 306, 308, 310 by the corresponding pixel position in each data stream and adding the results. For example, the data stream stitcher 312 may first multiply feathering weights 314 corresponding to the first data stream 306, 308, 310 by the pixel values of the first data stream 306, 308, 310 at each pixel position. The data stream stitcher 312 may then multiply feathering weights 314 corresponding to the second data stream 306, 308, 310 by the pixel values of the second data stream 306, 308, 310 at each pixel position. Then the data stream stitcher 312 may add the resulting pixel values from the first and second data streams 306, 308, 310 for each pixel position. Each pixel position within the overlap area 226 may be calculated on its own or in parallel for the blended data stream 316. In certain implementations where there are 8 or fewer pixel positions in the overlapping area 226, each pixel position may simultaneously be calculated in parallel. In other implementations where there are more than 8 pixel positions, the pixel positions may be calculated separately (e.g., individually or as separate subsets).

In certain implementations, the method 400 may be performed on a continuous basis. For example, the data stream processing system 302 may continuously perform and repeat the method 400 to determine and update the blending position 327. In additional or alternative implementations, the method 400 may be repeated at regular intervals. For example, the data stream processing system 302 may repeat the method 400 at regular time intervals (e.g., once every 0.5 seconds, 1 second, 5 seconds, 10 seconds, 30 seconds, 1 minute) and/or may repeat the method 400 for particular amounts of film scanned (e.g., once every 1 foot of film, 2 feet of film, 10 feet of film). Such implementations may reduce the amount of computing resources (e.g., memory capacity and/or processing power) required to determine the blending position 327.

Figure 5:
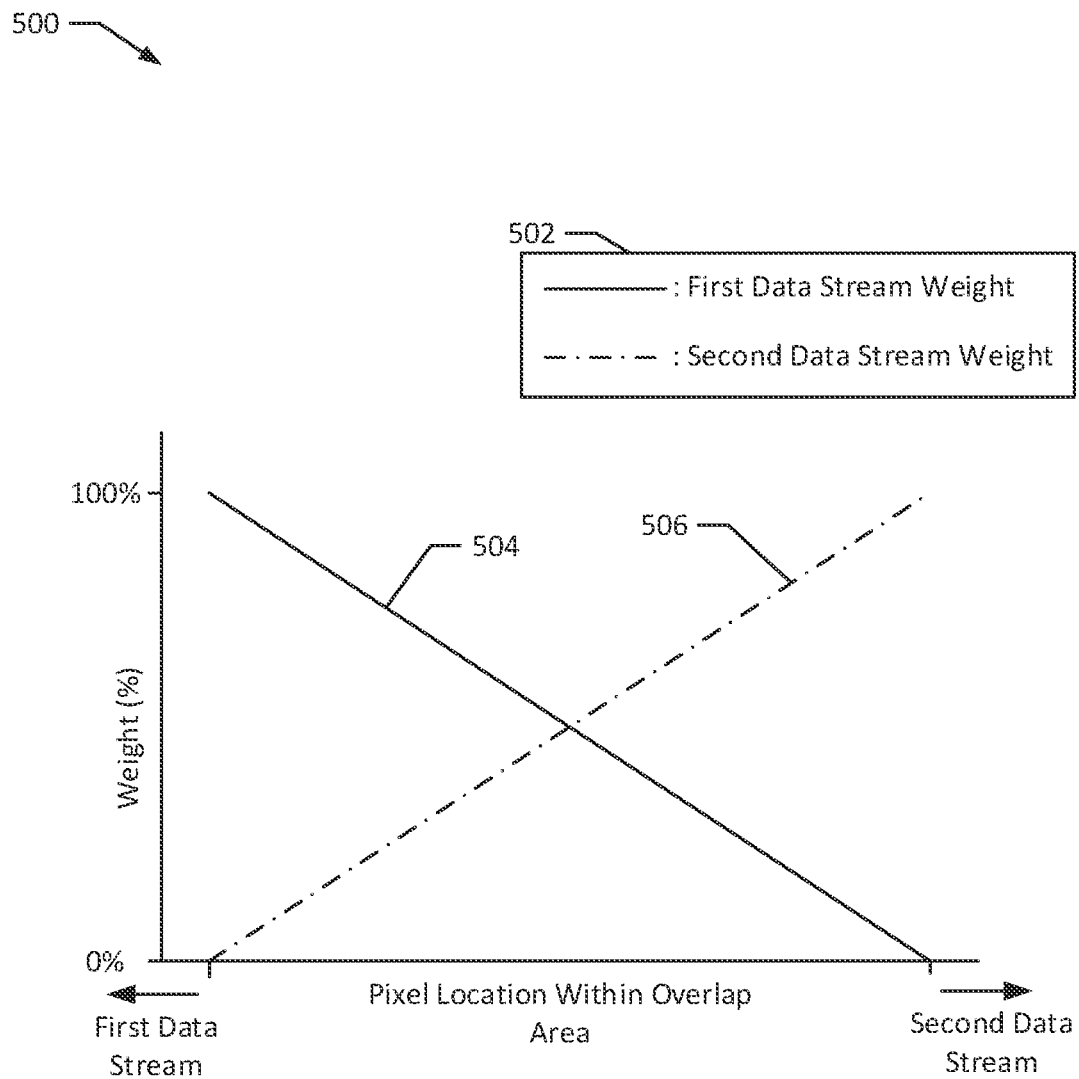
FIG. 5 illustrates feathering weights 500 according to an exemplary embodiment of the present disclosure.

FIG. 5 depicts feathering weights 500 according to an exemplary embodiment of the present disclosure. As depicted in FIG. 5, and according to the legend 502, the first data stream weight 504 begins with a 100% weight for the pixel value of pixels located closest to the edge of the overlap area 226 bordering the first data stream 306, 308, 310 and decrease linearly to a 0% weight for the pixels of the first data stream located closest to the edge of the overlap area 226 bordering the second data stream. Conversely, the second data stream weight 506 has a 0% weight for the pixel value of pixels located closest to the edge of the overlap area 226 bordering the first data stream 306, 308, 310 and increases linearly to a 100% weight for pixels located closest to the edge of the overlap area 226 bordering the second data stream. Accordingly, the blended data stream 316 will include pixel values based more strongly on the first data stream for pixel locations within the overlap area 226 located closer to the first data stream and will include pixel values based more strongly on the second data stream for pixel locations within the overlap area that are located closer to the second data stream. The weight 504, 506 depicted in FIG. 5 are merely exemplary, and other weights may be used in different implementations. For example, in certain implementations, the weights 504, 506 may not decrease or increase linearly across the overlap area. In other implementations, the weights 504, 506 may increase or decrease exponentially or quadratically, so long as the combined weight of the first and second data stream weights 504, 506 sums to 100% for each pixel position. In still further implementations, the weights 504, 506 may reach a maximum of less than 100% closest to the first and second data streams 306, 308, 310. For example, rather than reaching a maximum of 100%, the first and second data stream weights 504, 506 may instead have maximum values of 80%. Similarly, the weights 504, 506 may reach a minimum of greater than 0%, such as a minimum value of 20%.

Although discussed as being performed on two data streams (i.e., the first and second data streams), the method 400 may be repeated in order to blend more than two data streams. For example, if the line scan sensors 332, 334, 336 are arranged such that the line scan sensor 334 is positioned between the line scan sensors 332, 336 in a sensor array 200, 210, the method 400 may first be performed on the data streams 306, 308 for the adjacent line scan sensors 332, 334 and may then be performed on the data streams 308, 310 for the adjacent sensors 334, 336.

After generating the blended stream 316 for all overlapping data streams 306, 308, 310, the data stream processing system 302 may save the blended data stream 316 in multiple resolutions. For example, the data stream processing system 302 may save the blended data stream 316 in an original resolution captured by the line scan sensors 332, 334, 336 and may also convert the original resolution into one or more smaller resolutions. For example, the data stream processing system 302 may convert the original resolution into a hierarchy of reduced resolutions including one or more reduced data streams at ½, ¼, ⅛, 1/16, 1/32, 1/64, and 1/128 resolutions. Such a configuration may enable quick transition between resolutions when a user reviews the scanned contents of the film 118 while incurring only minimal additional storage requirements (i.e., ~33% additional storage required).

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, GPUs or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
   selecting, at a plurality of times while progressing a media from a supply to a take-up, a corresponding plurality of overlap areas on the media between a first field of view of a first line scan sensor that reads a first data stream from the media and a second field of view of a second line scan sensor that reads a second data stream;
   calculating, at each time in the plurality of times, a difference measure between the first data stream and second data stream in a current overlap area of the plurality of overlap areas for a current time of the plurality of times;
   adjusting, based on the difference measure for the current time, a size or a position of the overlap area for use at a subsequent time of the plurality of times as the media progresses such that the current overlap area has a first number of pixels and a subsequent overlap area corresponding to the overlap area for the subsequent time has a second number of pixels, wherein adjusting the size of the overlap area is performed in response to one or both of the first line scan sensor and the second line scan sensor moving over time; and
   blending the first data stream and the second data stream at the current time at the current overlap area.

2. The method of claim 1, wherein the first data stream and second data stream are blended according to feathering weights.

3. The method of claim 1, further comprising:
   selecting an initial overlap area of the plurality of overlap areas for an initial time of the plurality of times by scanning, before the initial time, a media different from the media being scanned.

4. The method of claim 1, wherein calculating the difference measure comprises:
   subtracting pixel values between corresponding pixel locations of the first data stream and second data streams within the overlap area.

5. The method of claim 1, wherein the calculating, at each time in the plurality of times, the difference measure produces a plurality of difference measures corresponding to different positions along a length of the media, the method further comprising:
   selecting a blending position corresponding to a given position of the different positions along the length of the media associated with a smallest difference among the plurality of difference measures, wherein the first data stream and the second data stream are blended at the current time at the current overlap area according to the blending position.

6. The method of claim 1, wherein adjusting the size of the overlap area comprises at least one of:
   varying a first lens or mirror configuration that redirects light passing through the media to the first line scan sensor to change the first field of view; and
   varying a second lens or mirror configuration that redirects light passing through the media to the second line scan sensor to change the second field of view.

7. The method of claim 1, wherein adjusting the size of the overlap area comprises reducing the size of the overlap area relative to a scanning area that projects light through the media.

8. The method of claim 1, wherein successive iterations of calculating the difference measure between the first data stream and second data stream and adjusting the size of the overlap area based thereon are performed in response to progressing a predefined length of the media from the supply to the take-up.

9. The method of claim 1, further comprising:
   storing the first data stream and second data stream as blended as a blended data stream to digitize the media; and
   converting the blended data stream into a hierarchy of reduced resolution versions.

10. A system comprising:
    a supply including a media to be scanned;
    a take-up to store the media after being scanned;
    a scanner, located between the supply and the take-up including a first line scan sensor having a first field of view and a second line scan sensor having a second field of view to scan the media while the media progresses from the supply to the take-up;
    a processor; and
    a memory storing instructions which, when executed by the processor, cause the processor to perform operations including:
       selecting, at a plurality of times while progressing the media from the supply to the take-up, a corresponding plurality of overlap areas on the media between a first field of view of a first line scan sensor that reads a first data stream from the media and a second field of view of a second line scan sensor that reads a second data stream;
       calculating, at each time in the plurality of times, a difference measure between the first data stream and second data stream in a current overlap area of the plurality of overlap areas for a current time of the plurality of times;
       adjusting, based on the difference measure for the current time, a size or position of the overlap area for use at a subsequent time of the plurality of times as the media progresses such that the current overlap area has a first number of pixels and a subsequent overlap area corresponding to the overlap area for the subsequent time has a second number of pixels, wherein adjusting the size of the overlap area is performed in response to one or both of the first line scan sensor and the second line scan sensor moving over time; and blending the first data stream and the second data stream at the current time at the current overlap area.

11. The system of claim 10, wherein the first data stream and second data stream are blended according to feathering weights.

12. The system of claim 10, further comprising:
selecting an initial overlap area of the plurality of overlap areas for an initial time of the plurality of times by scanning, before the initial time, a target media different from the media being scanned.

13. The system of claim 10, wherein calculating the difference measure comprises:
subtracting pixel values between corresponding pixel locations of the first data stream and second data streams within the overlap area.

14. The system of claim 10, wherein the calculating, at each time in the plurality of times, the difference measure produces a plurality of difference measures corresponding to different positions along a length of the media, the operations further comprising:
selecting a blending position corresponding to a given position of the different positions along the length of the media associated with a smallest difference among the plurality of difference measures, wherein the first data stream and the second data stream are blended at the current time at the current overlap area according to the blending position.

15. The system of claim 10, wherein adjusting the size of the overlap area comprises at least one of:
varying a first lens or mirror configuration that redirects light passing through the media to the first line scan sensor to change the first field of view; and
varying a second lens or mirror configuration that redirects light passing through the media to the second line scan sensor to change the second field of view.

16. The system of claim 10, wherein adjusting the size of the overlap area comprises reducing the size of the overlap area relative to a scanning area that projects light through the media.

17. The system of claim 10, wherein successive iterations of calculating the difference measure between the first data stream and second data stream and adjusting the size of the overlap area based thereon are performed in response to progressing a predefined length of the media-from the supply reel to the take-up.

18. The system of claim 10, further comprising:
storing the first data stream and second data stream as blended as a blended data stream to digitize the media; and
converting the blended data stream into a hierarchy of reduced resolution versions.

\* \* \* \* \*